March 19, 1929.  L. P. MOOERS  1,705,529
BRAKE MECHANISM
Original Filed Dec. 24, 1923   3 Sheets-Sheet 2
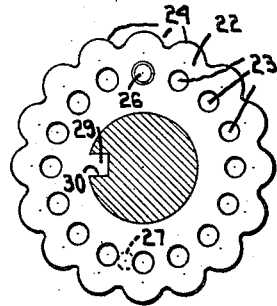
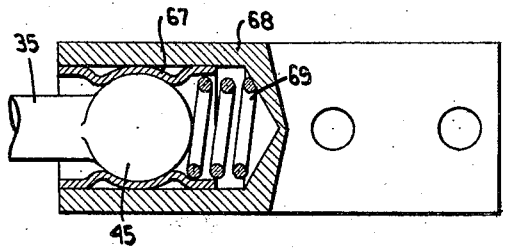
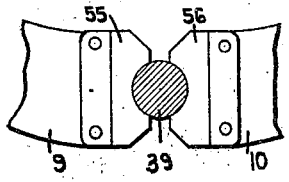
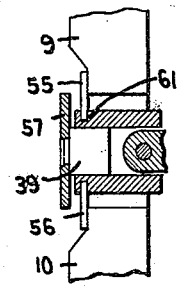
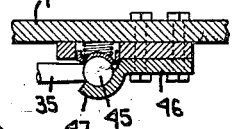
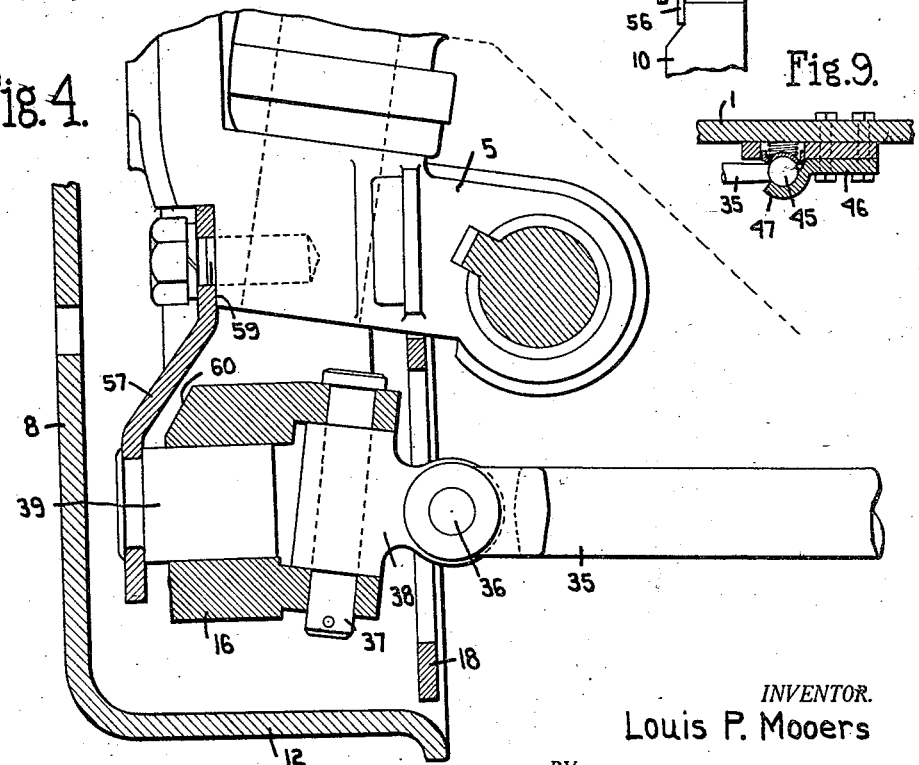
INVENTOR.
Louis P. Mooers
BY
ATTORNEYS.

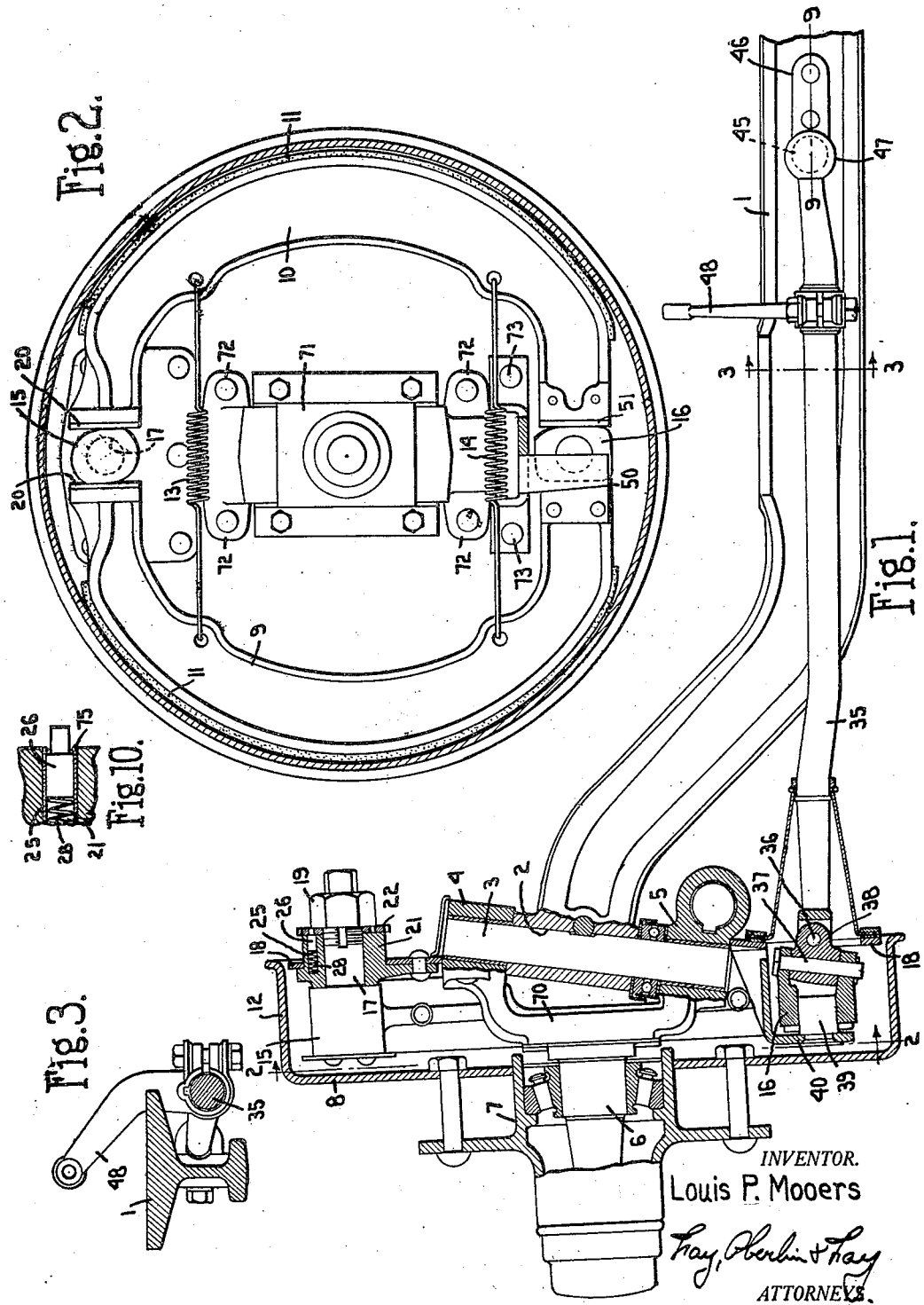

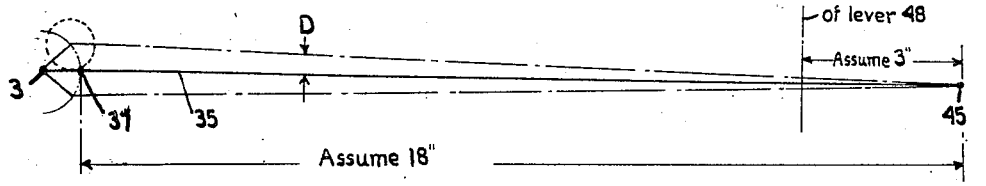
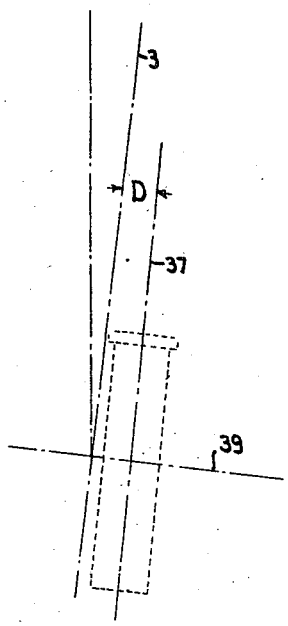
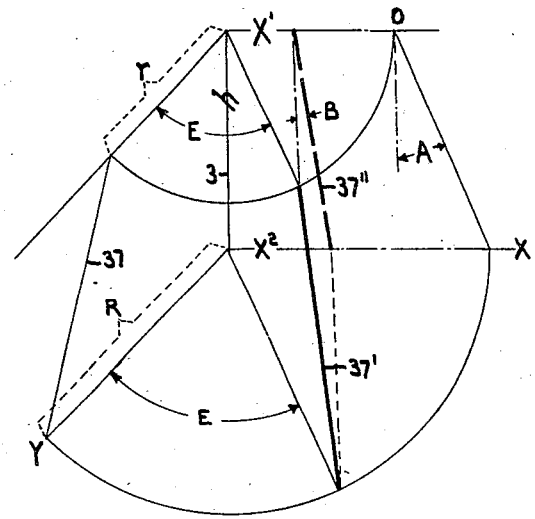

Patented Mar. 19, 1929.

1,705,529

UNITED STATES PATENT OFFICE.

LOUIS P. MOOERS, OF CLEVELAND, OHIO, ASSIGNOR TO THE COLUMBIA AXLE COMPANY, OF CLEVELAND, OHIO, A CORPORATION OF OHIO.

BRAKE MECHANISM.

Application filed December 24, 1923, Serial No. 682,436. Renewed August 7, 1928.

The present improvements, relating, as indicated, to brake mechanism are more particularly directed to the improved brake mechanism and means for operating the same for use in the steering wheels of vehicles in which the usual problems of brake design and operation are complicated by the oscillatory mounting of the wheels and are there rendered additionally difficult by the fact that the axis of oscillation of the wheel is not within, nor parallel to, the plane of the wheel. The principal object of the present invention is the provision of very much improved and simplified mechanism for the purpose stated, which shall be economical in construction and convenient of assembly, irrespective of the normal manufacturing tolerances in the sizes of the various parts. A second object of the invention is the provision of brake members which shall be extremely efficient in operation. Other objects will appear from the following description. To the accomplishment of the foregoing and related ends, said invention, then consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Fig. 1 is a vertical section through the hub and brake drum of one of the steering wheels of the vehicle showing the axle on which the wheel is mounted in elevation; Fig. 2 is a sectional view taken on the line 2—2, Fig. 1, looking at the interior of the brake drum and brake shoes; Fig. 3 is a section on the line 3—3 of Fig. 1; Fig. 4 is an enlarged view of cam and mounting therefor in section; Fig. 5 is a view in elevation of the adjuster for initially setting the position of the fixed ends of the brake shoes; Fig. 6 is a longitudinal section showing a modification of the mounting for the inner end of the brake cam shaft; Fig. 7 is a transverse section showing a modification of the cam; Fig. 8 is an elevation of the ends of the brake shoes and the stud; Fig. 9 is a section on the line 9—9, Fig. 1; Fig. 10 is a detailed fragmentary view of the adjusting cam locking mechanism; Fig. 11 is a diagrammatic plan view illustrating the positions of the brake cam shaft when the wheels are swung through their entire range of movement; Fig. 12 is a diagrammatic vertical section showing the relation of the axis of oscillation of the wheel and the axis of the pin of the universal joint; and Fig. 13 is a geometrical perspective showing the action of the universal pin during oscillation of the wheel.

Referring now to Figs. 1 and 2, there is shown an axle in the form of an I-beam 1 which is provided with a slightly inclined opening 2 extending through each of its ends in each of which is received a pivot member or king pin 3 which is also mounted in openings in forked arms 4 and 5 of an axle spindle 6. Upon the axle spindle 6 are rotatably mounted a hub 7 and wheel (not shown) and also a brake drum 8 fixed to the wheel. Extending about the yoke, from which extend the spindle arms 4 and 5, is a plate 71 fitting snugly about the wheel spindle 6 and secured to the dust plate 18 which joins with the drum 8 in enclosing the brake mechanism now to be described.

The brake mechanism is shown in Fig. 2. It consists of two semi-circular shoes 9 and 10 provided on the outer surface with friction material 11, these shoes being mounted within the brake drum and being normally held out of engagement with the inner surface of the flange 12 of the drum by means of tensile springs 13 and 14. The shoes 9 and 10 are both movably mounted in the drum and are normally carried in their inner or disengaged position by means of the springs 13 and 14 against two cams 15 and 16. The cam 15 is a combined adjusting cam and anchor which is mounted upon the inner end of, or integral with, a bolt 17 carried on the dust plate 18 which is attached to the spindle by ears 72 thereon. The head of this bolt projects through the dust plate for convenient adjustment from outside of the drum and is secured by a nut 19. In the position shown in Fig. 2, the two shoes are adjusted to their initial relative position, the long dimension of the cam standing substantially vertically or in a plane substantially parallel with the planes of the two ends or "wear plates" 20 on the shoes 9 and 10.

Interposed between the nut 19 on the bolt and an anchor bracket 21 on the plate 18 through which the bolt passes, is an adjusting washer 22 which is shown in plan in Fig. 5, this washer being provided with a series of circumferentially arranged openings or recesses 23 and with a scalloped outer edge 24. Carried in the anchor bracket 21 in suitable recesses 25 are two plungers 26 and 27 each of which is normally pressed outwardly, by means of a spring 28, toward or into engagement with one of the recesses 23 in the washer 22. The washer is provided with an internally extending tongue 29 engaging with a correspondingly formed slot 30 in the bolt 17.

By loosening the nut 19 on the bolt 17 the washer 22 may be grasped by its roughened outer edge, first drawn outwardly disengaging it from the pins 26 and 27 and then turned to rotate the cam 15, thus spacing the inner ends of the two brake shoes 9 and 10 to the desired degree. When the desired position is reached, the washer is pressed inwardly, causing engagement of one of the pins 26 or 27 in one of the recesses 23 in the washer 22. The nut 19 is turned down on the bolt and the washer located in this position, thus locking the bolt and cam in the desired position and setting the inner ends of the two shoes. The two pins 26 and 27 are so mounted with respect to each other and to the equidistant recesses 23 in the washer that when the pin 26 is in engagement in one of the recesses, the pin 27 is in a position between two of the recesses so that a number of adjustments is provided, which is double the number of recesses in the washer, and thus a very fine and accurate setting may be given to the brake shoes. The pins 26 and 27 are held from removal from the anchor bracket by inturned edges 75 which prevent passage of the portion of the pins of full diameter, (see Fig. 10).

The brake shoes are operated by means of the other cam 16 which is actuated by means of a brake cam shaft 35 universally joined to the cam by means of a transverse or horizontal pin 36 and a substantially vertical pin 37. The pin 37 passes vertically through the cam 16 and through an intermediate member 38 which is also engaged by the pin 36. The cam 16 is hollow, being provided with a circular opening and is snugly fitted over a stud 39 carried on a plate 40 which is secured to the dust plate 18 by bolts 73 and is thus oscillated with the knuckle and the wheel, the universal joint interposed between the cam and the brake shaft 35 permitting this action, while the cam slides on the stud 39 to accommodate for movements of the cam shaft during oscillation of the wheel.

The inner end of the brake cam shaft is provided with a ball end 45 and is mounted for a slight universal movement against the rear face of the axle 1 where it is held by means of a plate 46 having a partly spherical end 47 which engages the ball 45 and holds the same in position on the axle. This cap 47 engages over the ball to a sufficient extent to prevent any longitudinal movement of the shaft 35 while permitting the shaft to rotate on its normal axis and to swing slightly in any direction about the ball 45 as a pivot. An operating arm 48 is attached to the shaft 35 and is then connected at its upper end by any suitable means to a brake pedal for operating the shaft. The action of the brakes is as follows.

Whenever rotation of the shaft 35 is effected by pulling on the end of the crank or arm 48, the cam 16 is rotated on the stud 39 as an axis, this action of the cam forcing apart the two lower ends 50 and 51 of the brake shoes and thrusting these shoes into engagement with the inner flange 12 of the brake drum. Since the other ends of the brake shoes 9 and 10 are not connected to the adjusting cam 15, but are free to move radially along the faces of this cam, the shoes move outward into a complete engagement with the drum throughout the entire extent of each shoe, thus providing a very much more efficient braking action than can be secured where the upper ends of the shoes are mounted on fixed pivots. Whenever the brake is released the springs 13 and 14 return the shoes to their normal position out of contact with the drum. The shoes are provided with plates 55 and 56, (Fig. 8), provided with semi-circular recesses normally engaging over either the stud 39 or a recessed cylindrical portion 61 on the cam, as shown in Fig. 7. The plates act to center and position the shoes which allows the latter to slide freely over the cam 15 for bodily outward movement into engagement.

A modification of the above construction is shown in Figs. 4, 6 and 7, in which the cam 16 is mounted as before on the stud 39 carried on the plate 57, but in this construction the latter is bolted to a faced-off portion 59 of the lower arm 5 of the spindle, the cam 16 being beveled off slightly at its upper end 60 to clear the plate 57.

A further change in the construction shown in Figs. 4, 6 and 7 is that the inner end of the brake cam shaft is allowed to float, namely to move transversely of the vehicle and toward or away from the steering wheel so that the position of the cam 16, with respect to the stud 39, is unchanged during all movements of the steering wheel, thus allowing the entire surfaces of the cam to at all times operate against the inner ends of the brake shoes. This result is secured by mounting the ball 45 on the brake cam shaft 35 in a tubular socket 67 which is crimped around the ball sufficiently to prevent withdrawal of the cam from the socket. The tubular socket is slidably mounted in a fixed socket 68 which is bolted to the axle, there being a spring 69 interposed between the bottom of the socket in the member 68 and the ball 45 which normally maintains the cam in its innermost position on the stud, but which allows for any shortening of the total length of the brake cam shaft and cam due to turning of the steering wheels to be absorbed in the spring, instead of by relative motion between the cam and the stud upon which it is mounted. In either construction, however, the cam and cam shaft are supported at their ends only and the cam shaft is given a limited universal movement about its inner end, while the cam is carried on the stud and given a universal movement with respect to the shaft.

The cam shaft is bodily moved about its inner end, that is, it is oscillated about its inner end and in a horizontal plane upon oscillation of the wheels through an angle marked D in Figs. 11 and 13. The lever which operates the brake cam shaft upon depression of the brake pedal is attached to the shaft intermediate the ends of the latter. The upper end of this lever is subject to the same motion of translation as the shaft and partakes of any motion of translation due to the oscillation of the cam shaft, the amount of this motion of translation depending upon its location along the shaft. It is plain that if the upper end of this lever is held stationary, as for instance by the brake rod connection to the foot pedal while the shaft oscillates, it will have the effect, due to the bottom part of the lever moving with the shaft and the top part being thus held stationary, of rotating the shaft and so partially applying the brakes. To compensate for this small motion of translation which the upper end of the lever would tend to partake of, and to eliminate any effect of the oscillation of the cam shaft due to the oscillation of the wheels, I proceed in the following manner:—

If we assume that the brake cam shaft is 18 inches long and that the lever is mounted 3 inches from the inner end of the shaft, or at one-sixth of the distance between the ends of the shaft, and if we assume that the center of pin 37 is $\frac{5}{16}$ from the center of king pin 3, then, for a total movement of translation or bodily swing of the cam shaft at its outer end the point of attachment to the lever will have a movement of translation of one-sixth times the total amount. If this total movement is $\frac{7}{16}$, the movement of the lever arm at its point of attachment to the cam shaft is ⅙ times $\frac{7}{16}$, or .073 inches, which is the movement of translation for the lower end of the lever for an angular swing of 80° of the wheel of the vehicle. The motion of translation is equal to the tangent of the angle D, and this angle increases from zero to infinity. The maximum value of the tangent is $\frac{5}{16}$ inches for a 90° swing of the wheel. The tangent of the maximum angle is $\frac{5}{16}$ divided by 18 (inches), which is equal to .0174, or 1° of movement of the brake cam shaft. It is this 1° of angular movement of this shaft which must be compensated for to prevent a corresponding movement of the lever upon turning the front wheels.

It is possible to compensate for the angular movement defined above, or for any other angular movement which may be determined for different lengths of the brake cam shaft, the point of attachment of the lever, and the distance of the universal pin from the axis of the wheel, (which latter distance has been assumed to be $\frac{5}{16}$ inches in the above example), by giving a certain angularity to the universal pin 37. Upon oscillation of the wheel, the pin 37 is rotated about the axis of the pin 3 as a center and generates a conical surface, which is shown in Fig. 13, in which the axis of the pin is indicated by the line 3, the original position of the pin by the line 37 (in Fig. 13), and the position of the pin upon an oscillation of 40° of the wheel by the line 37'. The angle necessary to apparently rotate the cam shaft to keep the lever eye stationary when the bottom of the lever is subject to a motion of translation with the shaft, is measured by the projection of line 37' on the plane $XOX$ and at 40° or the angle $E$, assumes the position 37'' and at 90° the position $XO$ (if 90° motion were possible). In the diagram shown in Fig. 13, with the angles and distances as marked thereon, we can determine the initial angular position required for the pin 37 in the following manner.

$$x' = r \sin E$$
$$x^2 = R \sin E$$
$$x^2 - x' = (R-r) \sin E$$
$$\frac{x^2 - x'}{h} = \frac{R-r}{h} \sin E$$

$$\text{Tan. } B = \tan. A \sin E.$$

Returning to the specific dimensions and angles referred to before, the tangent of $B$ times the length of the lever must equal 3 inches times the tangent $D$, but if the length of the lever in the present example is assumed to be 3 inches the tangent of $B$ must equal the tangent of $D$. Therefore $B$ is equal to $D$, but since $D$ is equal to 1° (at the maximum) therefore $B$ is equal to 1° at the maximum and is equal to $A$. Therefore the initial angularity given to the pin 37 must be 1° less than the position of the parallelism with the axis 3 of oscillation of the wheel.

The other factors affecting the angularity affect it to such a slight degree that they can be disregarded since they have no appreciable result in applying the brakes when the wheels are turned.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a brake mechanism for vehicles, the combination of an axle, a wheel rotatable thereon and oscillatory about an axis disposed at a slight angle to the plane of said wheel, brake means mounted on said axle and movable into engagement with said wheel, an actuating element adapted, upon movement, to operate said brake means, said element being disposed substantially in alignment with the axis of oscillation of said wheel, and being oscillatory with said wheel, and a shaft disposed substantially horizontally, said shaft and member being pivotally connected about an axis substantially parallel with, but spaced from, the axis of oscillation of said wheel.

2. In a brake mechanism for vehicles, the combination of an axle, a wheel rotatable thereon and oscillatory about an axis disposed at a slight angle to the plane of said wheel, brake means mounted on said axle and movable into engagement with said wheel, an actuating element adapted, upon movement, to operate said brake means, said element being disposed substantially in alignment with the axis of oscillation of said wheel and being oscillatory with said wheel, a shaft disposed substantially horizontally, and a universal joint connecting said shaft and element, said joint having one of its axes disposed substantially parallel to, but spaced from, the axis of oscillation of said wheel.

3. In a brake mechanism for vehicles, the combination of an axle, a spindle, a wheel rotatable on said spindle, means connecting said spindle and said axle, said means adapting said spindle and said wheel thereon to oscillate about an axis disposed at a slight angle to the plane of said wheel, brake means mounted on said spindle and movable into engagement with said wheel, an actuating element adapted, upon movement, to operate said brake means, said element being oscillatorily supported upon said spindle and being disposed substantially in alignment with the axis of oscillation of said spindle, and a shaft disposed substantially horizontally, said shaft and element being pivotally connected about an axis parallel with, but spaced from, the axis of oscillation of said spindle.

4. In a brake mechanism for vehicles, the combination of an axle, a spindle, a wheel rotatable on said spindle, means connecting said spindle and said axle, said means adapting said spindle and said wheel thereon to oscillate about an axis disposed at a slight angle to the plane of said wheel, brake means mounted on said spindle and movable into engagement with said wheel, a stud mounted on said spindle beneath and in substantial alignment with the axis of oscillation of said spindle, an actuating element oscillatorily mounted upon said stud substantially in alignment with the axis of oscillation of said spindle, and a shaft disposed substantially horizontally, said shaft and said element being pivotally connected about an axis parallel with, but spaced from, the axis of oscillation of said spindle.

5. In a brake mechanism for vehicles, the combination of an axle, a spindle, a wheel rotatable on said spindle, means connecting said spindle and said axle, said means adapting said spindle and said wheel thereon to oscillate about an axis disposed at a slight angle to the plane of said wheel, brake means mounted on said spindle and movable into engagement with said wheel, said brake means terminating adjacent the central lower portion of said wheel, a cam in substantial alignment with the axis of oscillation of said wheel, a rigid shaft connected to said cam for operating the same, said shaft being disposed adjacent said axle, means supporting said shaft for limited universal movement on said axle at the end spaced from said cam, and means for supporting said cam.

6. In a brake mechanism for vehicles, the combination of an axle, a spindle, a wheel rotatable on said spindle, means connecting said spindle and said axis, said means adapting said spindle and said wheel thereon to oscillate about an axis disposed at a slight angle to the plane of said wheel, brake means mounted on said spindle and movable into engagement with said wheel, said brake means terminating adjacent the central lower portion of said wheel, a cam in substantial alignment with the axis of oscillation of said wheel, a shaft disposed adjacent said axle, and extending along the same to a point adjacent said cam, means supporting the end of said shaft spaced from said cam on said axle for universal movement, means supporting said cam on said spindle for oscillatory movement, and a universal joint connecting said cam and said shaft.

7. In a brake mechanism for vehicles, the combination of an axle, a spindle, a wheel rotatable on said spindle, means connecting said spindle and said axle, said means adapting said spindle and said wheel thereon to oscillate about an axis disposed at a slight angle to the plane of said wheel, brake means mounted on said spindle and movable into engagement with said wheel, said brake means terminating adjacent the central lower portion of said wheel, a cam in substantial alignment with the axis of oscillation of said wheel, a shaft disposed adjacent said axle, and extending along the same to a point adjacent said cam, means supporting the end of said shaft spaced from said cam on said axle for universal movement, means supporting said cam on said spindle for oscillatory and slidable movement, and a universal joint connecting said cam and said shaft, said joint having an axis adjacent to, and in substantial parallelism with, the axis of oscillation of said spindle.

8. In a brake mechanism for vehicles, the combination of an axle, a spindle, a wheel rotatable on said spindle, means connecting said spindle and said axle, said means adapting said spindle and said wheel thereon to oscillate about an axis disposed at a slight angle to the plane of said wheel, brake means mounted on said spindle and movable into engagement with said wheel, said brake means terminating adjacent the central lower portion of said wheel, a cam in substantial alignment with the axis of oscillation of said wheel, a shaft disposed adjacent said axle, and extending along the same to a point adjacent said cam, means supporting the end of said shaft spaced from said cam on said axle for universal and slidable movement therealong, means supporting said cam on said spindle for oscillatory movement, and a universal joint connecting said cam and said shaft.

9. In a brake mechanism for vehicles, the combination of an axle, a spindle, a wheel rotatable on said spindle, means connecting said spindle and said axle, said means adapting said spindle and said wheel thereon to oscillate about an axis disposed at a slight angle to the plane of said wheel, brake means mounted on said spindle and movable into engagement with said wheel, said brake means terminating adjacent the central lower portion of said wheel, a cam in substantial alignment with the axis of oscillation of said wheel, a shaft disposed adjacent said axle, and extending along the same to a point adjacent said cam, means supporting the end of said shaft spaced from said cam on said axle for universal and slidable movement therealong, means supporting said cam on said spindle for oscillatory movement, and a universal joint connecting said cam and said shaft, said joint having an axis adjacent to, and in substantial parallelism with, the axis of oscillation of said spindle.

10. In a brake mechanism for vehicles, the combination of an axle, a spindle, a wheel rotatable on said spindle, means connecting said spindle and said axle, said means adapting said spindle and said wheel thereon to oscillate about an axis disposed at a slight angle to the plane of said wheel, brake means mounted on said spindle and movable into engagement with said wheel, said brake means terminating adjacent the central lower portion of said wheel, a cam in substantial alignment with the axis of oscillation of said wheel, a shaft disposed adjacent said axle, and extending along the same to a point adjacent said cam, means supporting the end of said shaft spaced from said cam on said axle for universal movement, a universal joint connecting said cam and said shaft, and means on said spindle, said means engaging and supporting said cam, and therethrough, the adjacent end of said shaft.

11. In a brake mechanism for vehicles, the combination of an axle, a spindle provided with forked arms disposed above and below the end of said axle, said arms and said axle having aligned openings, a pivot member received in said openings, a wheel rotatable on said spindle, said wheel being in a plane at an acute angle with the axis of said pivot member, a brake drum mounted on said wheel, braking members mounted on said spindle and movable outwardly into engagement with said drum, a cam disposed beneath said pivot member and adapted to be oscillated to operate said brake members, said cam being provided with a centrally disposed cylindrical opening adjacent said brake drum, an arm mounted on the lower of said forked arms on said spindle, said last-named arm having a cylindrical stud thereon extending into such opening in said cam and supporting said cam for oscillatory and slidable movement, and means for oscillating said cam.

12. In a brake mechanism for vehicles, the combination of a brake drum, two brake shoes mounted therein for radial movement into engagement with said drum, a cam mounted between two adjacent ends of said shoes, said cam being adapted to vary the spacing of said shoes, a second cam mounted between the other ends of said shoes for operating the same, and means normally positioning said shoes radially with respect to said second cam.

13. In a brake mechanism for vehicles, the combination of a brake drum, two brake shoes mounted therein for radial movement into engagement with said drum, a cam mounted between two adjacent ends of said shoes, said cam being adapted to vary the spacing of said shoes, a second cam mounted between the other ends of said shoes for operating the same, and means normally positioning said shoes radially with respect to said second cam, said means including plates secured to said shoes and centering upon said cam.

14. In a brake mechanism for vehicles, the combination of a brake drum, two brake shoes mounted therein for radial movement into engagement with said drum, a cam mounted between two adjacent ends of said shoes, said cam being adapted to vary the spacing of said shoes, a second cam mounted between the other ends of said shoes for operating the same, said cam having a cylindrical portion and plates on said brake shoes engaging such cylindrical portion of said cam, said plates normally positioning said shoes with respect to said cam and said drum.

15. In brake mechanism for vehicles, the combination of an axle, a wheel rotatable thereon and oscillatory about an axis at approximately right angles to said axle, brake means mounted on said axle and said wheel and movable into engagement, a brake cam shaft having its inner end pivotally mounted on said axle, and oscillatory in a horizontal plane about such inner end, an operating lever attached to said shaft intermediate its ends, and connections between said shaft and said brake means, said connections including a pin and elements pivotally connected thereto, said pin being mounted at an angle to the axis of oscillation of said wheel sufficient to compensate in the movement of said lever for the oscillation of said shaft produced by bodily movement thereof upon oscillation of said wheel.

16. In brake mechanism for vehicles, the combination of an axle, a wheel rotatable thereon and oscillatory about an axis at a slight angle to the plane of said wheel, brake means mounted on said axle and said wheel and movable into engagement, a brake cam shaft having its inner end pivotally mounted on said axle, and oscillatory in a horizontal plane about such inner end, an operating lever attached to said shaft intermediate its ends, and connections between said shaft and said brake means, said connections including a pin and elements pivotally connected thereto, said pin being mounted at an angle to the axis of oscillation of said wheel sufficient to compensate in the movement of said lever for the oscillation of said shaft produced by bodily movement thereof upon oscillation of said wheel.

17. In a brake mechanism for vehicles, the combination of a cylindrical drum, an adjusting cam mounted adjacent the periphery of said drum, two semi-circular brake shoes, each having one end disposed against said cam, said shoes being slidable radially over said cam into engagement with said drum, a brake actuating cam disposed between the other ends of said shoes, and means acting on said shoes and said last-named cam to normally fix the radial position of said shoes, said means including interengaging elements on said shoes and actuating cam.

18. In a brake mechanism for vehicles, the combination of a cylindrical drum, an adjusting cam mounted adjacent the periphery of said drum, an actuating cam also mounted adjacent the periphery of said drum in spaced relation to said adjusting cam, brake shoes normally out of engagement with said drum, resilient means maintaining said shoes in contact with said cams, a member coaxial with said actuating cam, and means on said brake shoes normally engaging said member but being releasable therefrom upon actuation of said shoes radially outward, the engagement between said member and means determining the normal radial position of said shoes.

Signed by me this 21st day of December, 1923.

LOUIS P. MOOERS.